United States Patent [19]
Duffy

[11] 3,858,262
[45] Jan. 7, 1975

[54] METHOD OF MAKING SELF-LOCKING INTERNALLY THREADED ARTICLES

[75] Inventor: Richard J. Duffy, Salem, Mass.

[73] Assignee: USM Corporation, Flemington, N.Y.

[22] Filed: Sept. 25, 1973

[21] Appl. No.: 400,502

Related U.S. Application Data

[63] Continuation-in-part of Ser. No. 314,854, Dec. 13, 1972, abandoned.

[52] U.S. Cl. .................................. 10/86 A, 10/10 P
[51] Int. Cl. ............................................ B21d 53/24
[58] Field of Search ........... 10/10 P, 86 A; 118/308, 118/317; 151/7

[56] References Cited
UNITED STATES PATENTS

| | | | |
|---|---|---|---|
| 3,294,139 | 12/1966 | Preziosi | 10/10 P |
| 3,416,492 | 12/1968 | Greenleaf | 151/7 X |
| 3,452,714 | 7/1969 | Burke et al. | 118/308 X |
| 3,557,750 | 1/1971 | Gallagher | 118/308 |
| 3,579,684 | 5/1971 | Duffy | 10/10 P |
| 3,720,533 | 3/1973 | Gallagher | 151/7 X |

Primary Examiner—C. W. Lanham
Assistant Examiner—E. M. Combs
Attorney, Agent, or Firm—Benjamin C. Pollard; Vincent A. White; Richard B. Megley

[57] ABSTRACT

Method of making a self-locking internally threaded article such as a nut including a locking body or patch of normally hard, tough, resilient thermoplastic resin adhered to the threaded surface. The article is mounted on a support with the openings at the ends substantially free. A heater raises the temperature of the threaded portion to above the softening point of the resin and a powder jet and guide device directs a stream of fine particles of the resin entrained in a gaseous jet into one of the openings toward a selected area of the threaded surface. Suction is applied adjacent the other opening of the article to draw in air around the guide and through the threaded hole in the article. Resin particles contacing the threaded surface are caught by softening them and causing them to adhere to the threaded surface by heat from the threaded surface to build up a deposit of resin which is fused by heat from the surface to form a continuous plastic body and then hardened by cooling.

8 Claims, 4 Drawing Figures

METHOD OF MAKING SELF-LOCKING INTERNALLY THREADED ARTICLES

This is a continuation-in-part of Application Ser. No. 314,854, entitled "Method of Making Self-locking Internally Threaded Articles," filed Dec. 13, 1972, now abandoned.

BACKGROUND OF THE INVENTION

1. Field of the Invention

This invention relates to improvements in methods of making self-locking internally threaded articles in which deformable plastic is secured on the threaded surface of the articles in a relation to give a strong locking action between the article and a mating threaded surface.

2. Description of the Prior Art

In my earlier U.S. Pat. No. 3,579,684 of May 25, 1971, entitled Methods of Making Self-locking Threaded Elements there is disclosed a method in which a stream of fine particles of heat-softenable resin is directed against a threaded surface portion of a heated metallic element. Contacting particles are caught on the heated surface progressively to build up a deposit and the particles are fused to form a continuous plastic body which is then hardened by cooling.

Although the method is effective to form patches on both externally threaded and internally threaded articles, there is a substantial problem of a deposition of plastic on the end faces of an internally threaded element such as a nut and an undesirable spatter on the threaded surface other than the selected area, which interfered with wide use of the method for treating internally threaded elements.

It has been proposed to conduct fluidized plastic particles through a tube which leads down into a heated nut so that the fluidized material is directed substantially perpendicular against the threaded surface of a nut. However, this system calls for a complicated and expensive apparatus in addition to control and other difficulties.

SUMMARY OF THE INVENTION

It is an object of the present invention to provide a simple, rapid and inexpensive method for making a self-locking internally threaded element which avoids the difficulties of resin deposit on the end faces of the threaded element and deposits resin on the threaded surface in the selected area with minimum spatter on other portions of the threaded surface.

BRIEF DESCRIPTION OF THE DRAWINGS

The invention will be described further in connection with the attached drawings in which.

DESCRIPTION OF THE PREFERRED EMBODIMENTS

Figure 1:
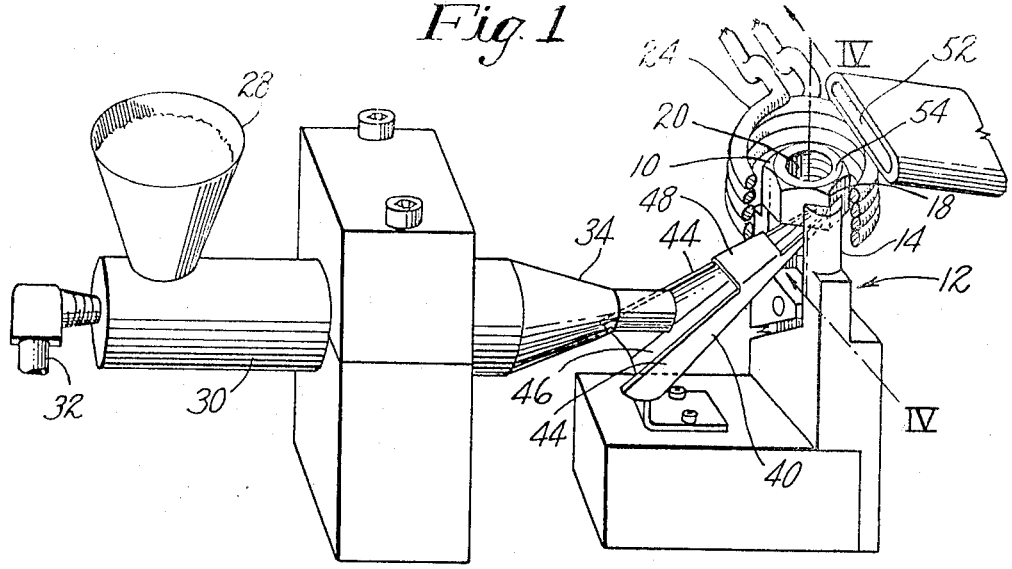
FIG. 1 is an angular diagrammatic view of a machine according to the present invention for forming a self-locking internally threaded element.
Figure 2:
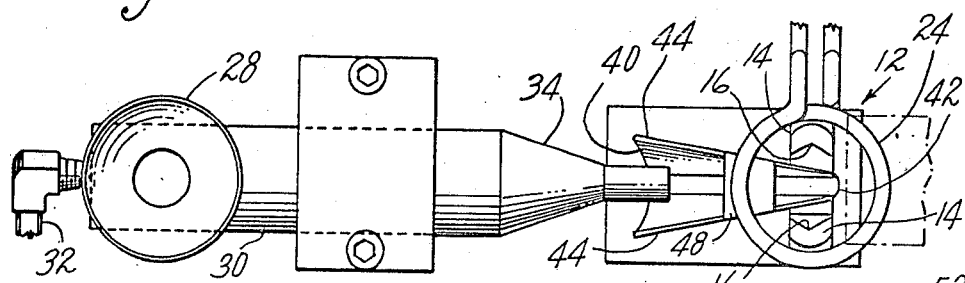
FIG. 2 is a diagrammatic plan view with parts removed of the machine of FIG. 1.

The following description relates primarily to providing a self-locking plastic body on the threaded surface of a nut, but it is to be understood that it is useful in providing a self-locking body on internally threaded portions of other articles where the threaded portion is open at both ends.

The process of forming a self-locking plastic body on the internally threaded surfaces of a nut is similar in many aspects to the process of forming a locking deposit described in my earlier patent referred to above. The nut 10 on which the plastic body is to be formed is mounted in holder 12, heated and then sprayed with finely divided resin particles which are caught and build up on the heated surface to form the plastic body. The holder 12 includes spaced posts 14 having inward facing notches 16 which support the nut with the corners 18 of the nut disposed in the notches 16 and with the entrance and exit openings 20 and 22 respectively, of the threaded portion of the nut 10 substantially unobstructed. The nut 10 may be given a primer coat on the threaded surface on which a plastic body is to be formed. If such coating is applied, the primer is dried before the nut is heated.

An induction heating coil 24 is shown surrounding the nut 10 to heat it before application of the plastic powder. Other heating means may be used such as an oven or a flame. As discussed below, this heating means brings the nut or other threaded article to a temperature above the softening temperature of the plastic particles for deposition and fusion of the particles in the forming of a patch.

Powdered plastic for deposition on the threaded surface is supplied as a stream of particles entrained in a gaseous jet. Any suitable device may be used to provide this stream of particles and jet, for example, the simple device shown in my earlier patent in which powder is disposed in a conical feed member 28 from which it is introduced into a gaseous stream in a manifold 30. Air or other gas is supplied under pressure to the manifold through the tube 32 and air with entrained particles in it is discharged from the forward end of the manifold 30 through a jet nozzle 34 secured to one end of the manifold 30.

The velocity of the stream leaving the nozzle may be in the same range as used in forming locking deposits on externally threaded articles, but it is preferred to operate in the lower end of the useful range. Air velocities of from about 10 to about 25 feet per second are preferred.

Guide member 40 is arranged to receive the jet of air and particle from the nozzle 34. One end 42 of this guide member is of dimensions and curved shape to project within the entrance opening 22 in nut 10 to screen off a leading thread or threads of the nut to prevent deposition of plastic material on the leading threads to enable easy assembly of the nut with a mating member. In the form shown, the body of the guide member 40 is in the shape of a trough with sides 44, which may be parallel to each other or tapered toward the nut and spaced, at least at the end nearest the nut, a distance not greater than the diameter of the threaded portion of the nut. The bottom 46 of the trough may be either flat or rounded. A rounded bottom tends to increase the quantity of powdered material along the center line of the deposit on the threaded surface of the nut. Other forms of guide may be used including tubes which may be connected directly to the device for supplying the jet of gas with entrained plastic particles.

The guide member 40, as shown, is disposed in the path of the gaseous jet and leads to the entrance opening 22. In the device shown using an open guide 40 the nut is disposed with its axis in up-and-down position and the guide inclines upwardly so that plastic particles in the gaseous jet are deflected upwardly and guided through the entrance opening 22 of the threaded portion at the lower end of the nut toward the selected area of the surface of the threaded portion on which it is desired to form a locking patch. Where the gaseous jet is substantially horizontal, the guide member may be at an angle of from about 30° to about 60°, preferably 40° to 50° to the horizontal. The guide 40 prevents spreading of the gaseous jet and directs it into the entrance opening 22 of the nut for passage upwardly through the threaded portion for discharge through the exit opening 20. It has been observed that one of the effects of the guide is to slow down the speed of the particles relative to the speed of the gas and to concentrate the plastic particles in space adjacent the area of the threaded portion to be coated leaving portions of the gaseous jet spaced further from the selected area poorer in particles so that there is less plastic available for deposition on areas of the threaded surface other than the selected area. Cover member 48 is provided across a portion of the upper side of the guide member 40 to prevent plastic particles from bouncing up against the lower face 50 of the nut 10.

Where a closed, e.g., tubular guide member (not shown) is used to direct the jet and particles into the entrance opening 22 and against the selected threaded portion, the threaded article may be disposed with its axis other than up and down and the jet and particles need not pass upwardly. However, even with such other guide members, there are substantial advantages in the upward movement and the process will be further described in terms of this upward movement.

In a preferred form, an intake orifice 52 of a vacuum system is disposed closely above the upper face 54 of the nut and adjacent the edge of the threaded portion on the side of the threaded portion on which the selected area is located. The vacuum draws in particles which have passed up through the threaded portion so that they cannot fall onto the face 54 of the nut. Additionally, it appears that the vacuum system orifice 52 so disposed draws in air around the guide member and through the threaded portion to give a superior path to the stream of gas and particles passing up through the threaded portion so that there is less turbulence and hence less chance for spatter of particles on undesired threaded surface areas.

Figure 3:
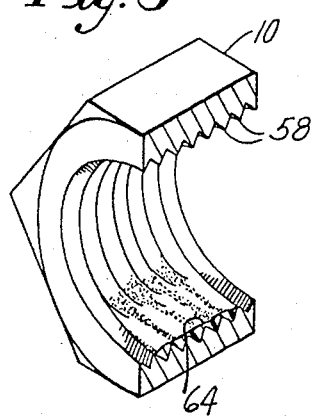
FIG. 3 is an angular sectional view of a treated nut showing the disposition of a locking patch on the thread.

Particles of resin deflected up by the guide member 40 first strike the lower faces 56 of the threads 58 and are caught and held on those faces by the heat of the surface. Further particles may bounce off from incompletely fused resin held on the lower faces 56 into contact with the upper surfaces 60 of the threads 58 where they are caught and held, and still other particles may be carried by eddy currents adjacent the threads 58 to collect in the valleys 62 between upper and lower faces of the threads where they are caught and held on hot surfaces of the threads to build up a plastic body 64. Heat from the threaded surface fuses the resin particles to a coherent body. Ordinarily, the sensible heat of the nut 10 will be adequate to effect complete fusion but further heat may be supplied if needed. When the nut 10 and body 64 of resin on the threaded surface have cooled, the resin is in the form of coherent tough, resilient patch covering the crests, sides and valleys of the selected areas of the internally threaded surface as shown in FIG. 3. The nut 10 may be removed from the holder 12 at any time after the resin has been deposited on the surface.

Where a primer or tying coat is applied to the threaded surface prior to heating and application of the plastic, the primer or tying agent will be softened by the heating step so that it will aid in trapping the resin particles in the stream directed against it and also will improve the union between the applied resin particles and the threaded surfaces. A wide variety of heat-softenable resin primers or tying agents may be used such, for example, as polyamide resins, epoxy resins, resorcinol aldehyde resins, and combinations of these. The primer or tying agent may be applied to the threaded surface in a volatile solvent solution. For example, a 10 percent solvent solution of an alcohol nylon in denatured alcohol gives good results.

The locking bodies or patches are formed of tough, resilient heat-softenable resin materials. Polyamide and polyester resins have been found particularly useful and a preferred polyamide resin is nylon 11. The resin materials are applied in the form of fine particles. The size of the particles to be used depends to some extent on the size of the threaded element to which the patch is to be applied. The smaller the threaded element the smaller the particles desired.

It has been found that effective priming for combination with the resin of the locking deposit may be obtained using a powder mixture formed by combining a minor proportion, i.e., from about 5 percent to about 35 percent by weight of a primer or tying agent such as those above noted, which may be in the form of particles or may be coated on the resin particles with a major portion, i.e., from about 95 percent to about 65 percent by weight of particles of the resin material which makes up the main body of the locking deposit, both percentages being on the weight of the powder mixture. It appears that the primer or tying material fuses at a lower temperature than does the primary resin material and also that it is more fluid and more capable of wetting the threaded surface so that the heat of the nut causes it to fuse and flow into wetting engagement with the threaded surface of the nut to provide the desired primer and tying action.

In forming locking deposits on the threaded surfaces of the nuts, the temperature selected will be governed by the softening or melting temperature of the primary resin material. Where the powdered resin is the polyamide, nylon 11 which has a melting point of 367°F., temperatures in the range of 450°F. to 650°F. have been found satisfactory. It is desirable that the temperature to which the nuts are heated be such that the sensible heat is sufficient to keep the temperature of the nuts above about 200°F. for at least about 20 seconds.

Heating of the threaded element, for example, a nut 10 may be effected by an inductive field or in an oven or by other heating means. It has been found that a frequency of 10 kilohertz, a steel threaded nut can be brought to the desired temperature in a matter of seconds. In a continuous process, the nuts may be passed through the inductive field at a rate providing the desired heating time.

Figure 4:
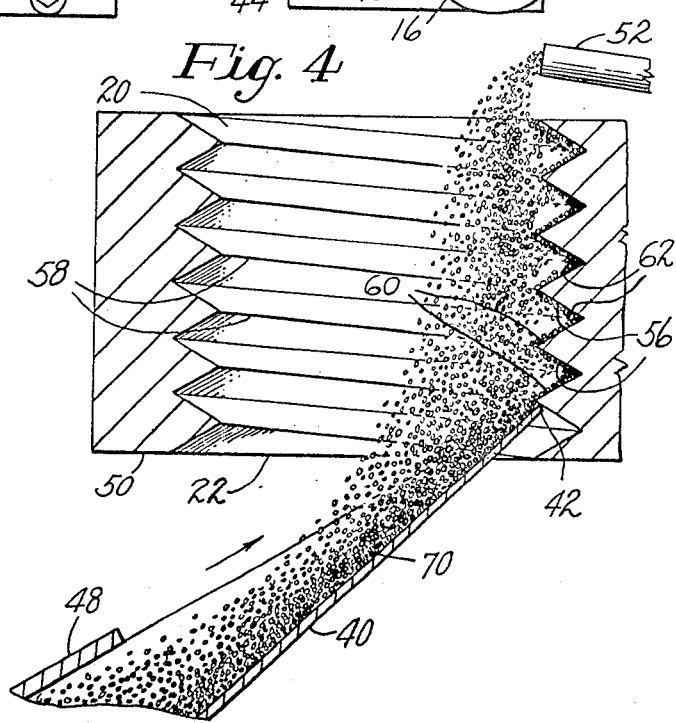
FIG. 4 is a diagrammatic view on an enlarged scale taken on the line IV—IV of FIG. 1 showing the relation of the guide member, cover member and nut and illustrating the paths of resin particles forming a locking patch.

The path of resin particles in forming locking deposits on the nut is shown in FIG. 4. Particles entrained in a gaseous jet are substantially uniformly distributed through the cross section of the gaseous stream in which they are carried out. With the gaseous stream strikes the guide member 40, the particles being heavier than gas become concentrated in the section 70 of the gaseous stream adjacent the guide surface 40 and are deflected upwardly toward the selected area of the internally threaded surface of the nut. A proportion of the particles travel directly to the lower surfaces 56 of the threads 58 and first particles striking these surfaces are softened and caught by the heat of the threads. Complete fusion of the particles which are caught is a time function so that at least for an instant the surfaces of the particles away from the hot surface of the nut are not fused and provide a surface from which later arriving particles bounce down to fall on the upwardly facing surfaces 60 of the threads 58 where they are softened and caught by the hot surface. Still other particles are carried by eddy currents for entry into the valleys 62 between the threads where they are caught by hot surfaces or by softened resin surfaces of previously caught resin to build up a locking body 64 of resin including the resin caught in the lower surfaces, the resin caught on the upper surfaces and the resin caught in the valleys of the selected areas of the nut.

An important factor is that resin particles which are not caught on hot surfaces are borne upward by he gaseous stream and are either caught by hot surfaces of higher threads or are discharged through the upper opening portion of the nut.

The following example is given as a possible aid in understanding the invention more fully; but it is to be understood that the invention is not limited to the particular materials, conditions or procedures of the example.

EXAMPLE

A nut of a three-eighths inch 24 size and with cadmium plus chromate surface was mounted on holders with its axis in an up-and-down position and with the upper and lower openings substantially unobstructed. A guide member angled upwardly at 45° was disposed with its upper end in the lower opening of the nut with its forward edge adjacent the threaded surface and at a level which shielded slightly more than one full thread at the lower end of the nut. A vacuum system was put in operation with the intake orifice adjacent the upper face of the nut and with its forward edge near the edge of the the opening in the nut on that side on which a locking deposit was to be formed. An induction heater coil surrounding the mounted nut was supplied with power at 450 kilohertz (nominal) for 2.5 seconds. This raised the temperature of the nut to about 550°F. Air was supplied to the manifold of a powder applying system at a rate of 20 SCFH and a vibrator was set in operation to initiate flow of powder from the conical feed member into the stream of air in the manifold. The powder was a mixture of a major portion of powered polyamide resin, (nylon 11) and a minor proportion of epoxy resin and had a particle size distribution such that less than 2 per cent were retained on a No. 70 sieve, about 90 per cent was retained on a NO. 140 sieve and about 5 per cent passed a NO. 325 sieve. The air and entrained powder passed through a three-eighths inch diameter horizontally directed jet nozzle against the surface of the guide member and were directed up through the lower opening of the nut. The powder concentrated adjacent the surface of the guide member and was deflected up through the opening in the nut toward the selected area of the nut on which a locking patch was to be formed. After about 2 seconds, the jet of air and powder was cut off and the nut removed from the holder. On examination, it was found that the selected area of the threaded surface of the nut had caught and held plastic powder and had fused it to a continuous firmly adhered plastic patch and the remaining threaded surface areas were substantially free from resin deposit.

After cooling, the nut was subjected to a standard torque test. The torques required for initial installation and for removal are as follows:

| Maximum Initial Torque in./lbs. | Minimum Removal Torque in./lbs. | | | | | |
|---|---|---|---|---|---|---|
| | 1st | 2nd | 3rd | 4th | 5th | 15th |
| 100 | 77 | 60 | 54 | 48 | 48 | 38 |

Having thus described my invention and what I claim as new and desire to secure as Letters Patent of the United States is:

1. The method of making a self-locking internally threaded article including a body of normally hard, tough, resilient thermoplastic resin adhered to the threaded surface comprising the steps of supporting the article with openings at the ends of the threaded portion substantially free, heating the threaded portion to a temperature above the softening point of the resin, providing a stream of fine particles of said resin entrained in a gaseous jet, directing particles of said stream through a first one of said openings toward a selected area of the surface of said threaded portion and in a direction including a component toward the opening at the other end of the nut and guiding said gaseous jet into and through said threaded portion and out through the other of said openings, applying suction adjacent the other of said openings in operative relation for drawing in air through said first opening to reduce deposition of resin particles on undesired areas of said articles, catching resin particles contacting the surface of said threaded portion by softening them and causing them to adhere to said surface by heat from said surface progressively to build up a deposit of resin on said selected area, fusing adhered particles to a substantially continuous body or resin, and cooling said body of resin to harden it to a solid body resistant to displacement and effective to give a locking action when a complementary threaded member is assembled with said threaded portion.

2. The method as defined in claim 1 in which said internally threaded article is a nut supported with its axis in upward position and in which said stream of fine particles of resin in a gaseous jet is directed upwardly into the lower opening of said threaded portion against said selected area, and passes upwardly through said threaded portion and out through the upper opening.

3. The method as defined in claim 2 in which said internally threaded article is a nut supported with its axis in upward position and in which said stream of fine particles of resin in a gaseous jet is directed against an upwardly inclined guide surface of which the upper ends lead into the lower openings of said threaded portion, to concentrate the fine particles by inertia in portions of the gaseous jet nearest said guide surface whereby the gaseous jet passing through the threaded portion of the nut is rich in resin particles for deposition in portions adjacent said selected areas and other portions of the gaseous jet are poor in resin particles to minimize spatter on areas other than said selected area.

4. The method of making a self-locking nut as defined in claim 3 in which said guide surface is a substantially open channel inclined upwardly at an angle at about 30° to about 60° from the horizontal.

5. The method of making a self-locking nut as defined in claim 2 in which the speed of said resin particles is slower than the speed of the gas and the speed of the gas is sufficient to carry up through the nut, resin particles which are not caught on heated surfaces.

6. The method of making a self-locking nut as defined in claim 3 in which the upper end of said guide surface protects the lower most thread surface against deposit of resin to enable easy assembly with a mating threaded element.

7. The method of making a self-locking nut as defined in claim 1 in which the fine particles in said gaseous jet are a mixture of a major portion of fine particles of said normally hard thermoplastic resin and a minor portion of a heat-softenable tying agent and in which said tying agent is fused on the threaded surface of said nut by heat from the surface of said nut to wet said surface and aid in building up adhered deposits of said normally hard thermoplastic resin on said nut.

8. The method of making a self-locking nut as defined in claim 1 including the steps of applying a thin, firmly adherent heat-softenable primer coat to said selected area of said nut on which one resin is to be deposited before heating said nut and directing said stream of particles at said nut.

* * * * *

UNITED STATES PATENT OFFICE
CERTIFICATE OF CORRECTION

Patent No. 3,858,262          Dated  January 7, 1975

Inventor(s) Richard J. Duffy

It is certified that error appears in the above-identified patent and that said Letters Patent are hereby corrected as shown below:

Claim 1, line 13, (column 6, line 42) cancel "nut"

and insert --threaded portion--

Signed and Sealed this

*Eighth* Day of *May 1979*

[SEAL]

Attest:

RUTH C. MASON
*Attesting Officer*

DONALD W. BANNER
*Commissioner of Patents and Trademarks*